United States Patent
Presetenback et al.

(10) Patent No.: US 8,457,387 B2
(45) Date of Patent: Jun. 4, 2013

(54) SYSTEM AND METHOD FOR INTERACTIVE ENVIRONMENTS PRESENTED BY VIDEO PLAYBACK DEVICES

(75) Inventors: Kyle Presetenback, Burbank, CA (US); James J. Madden, IV, Simi Valley, CA (US); Aaron Daly, Valley Village, CA (US); John Bernstein, Los Angeles, CA (US); David Jessen, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 802 days.

(21) Appl. No.: 12/381,556

(22) Filed: Mar. 13, 2009

(65) Prior Publication Data
US 2010/0232770 A1    Sep. 16, 2010

(51) Int. Cl.
*G06K 9/00*    (2006.01)
(52) U.S. Cl.
USPC ......................................................... 382/154
(58) Field of Classification Search
None
See application file for complete search history.

(56) References Cited

U.S. PATENT DOCUMENTS

| | | | | |
|---|---|---|---|---|
| 2004/0226043 | A1* | 11/2004 | Mettu et al. | 725/46 |
| 2005/0222841 | A1* | 10/2005 | McDowell | 704/212 |
| 2005/0286759 | A1* | 12/2005 | Zitnick et al. | 382/154 |

* cited by examiner

*Primary Examiner* — Brandon Hofman
(74) *Attorney, Agent, or Firm* — Farjami & Farjami LLP

(57) ABSTRACT

There is provided a video playback device for providing an interactive environment on a display in response to a user input. The video playback device comprises (1) a memory to store a plurality of images forming a plurality of viewpoints of the interactive environment; a plurality of transition sequences, wherein each of the plurality of transition sequences provides a video transition from one image to another image; and a linking structure linking the plurality of images with the plurality of transition sequences; (2) a processor to determine a direction of movement based on the user input; select a next one of the plurality of transition sequences and a next one of the plurality of images based on the direction of movement and the linking structure; and display the next one of the plurality of transition sequences and the next one of the plurality of images on the display.

19 Claims, 4 Drawing Sheets

120
SYSTEM AND METHOD FOR INTERACTIVE ENVIRONMENTS PRESENTED BY VIDEO PLAYBACK DEVICES

BACKGROUND OF THE INVENTION

1. Field of the Invention

The present invention relates generally to video playback. More particularly, the present invention relates to interactivity for video playback devices.

2. Background Art

When purchasing DVDs, Blu-ray discs, or other recorded video media, consumers often expect to receive much more than a simple transfer of the actual programming content. In response to this desire for value-added content, studios have widely adopted the practice of including various extras, such as audio commentaries, trailers and featurettes, behind the scenes and "making-of" segments, and limited edition packaging or extras which enhance the value proposition for the consumer beyond the actual programming content itself. These extra features provide greater levels of enjoyment, satisfaction, and ownership pride compared to video media with no extra content.

In particular, the often elaborately arranged and gorgeous backdrops, settings, environments, and landscapes used for films, animations, and other programming content may often deserve close attention in and of themselves. However, there is often little chance to thoroughly explore these environments during the course of the main feature, as a scheduled runtime must be adhered to and a plotline must be advanced. Thus, opportunities for exploring these settings are often reserved for extra content separate from the main feature.

However, even when these environments are presented within extra content, they are typically presented at a predetermined pace, covering material in a linear fashion irrespective of an individual viewer's interests. Thus, for example, the viewer might be particularly interested in the architectural design of an elaborate door in the environment, but the extra content might only gloss over the door for other content determined to appeal to a broader audience. Since the predetermined pace of the extra content might therefore cover only the most common audience interests, coverage of certain interests might be sacrificed for the sake of appealing to the largest audience. This may negatively impact the value of the extra content for certain viewers, therefore limiting the appeal of the video media product as a whole.

Accordingly, there is a need to overcome the drawbacks and deficiencies in the art by providing a way for video playback devices to allow user exploration of environments in a manner capable of catering to individual user interests.

SUMMARY OF THE INVENTION

There are provided systems and methods for interactive environments presented by video playback devices in response to user input, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for interactive environments presented by video playback devices in response to user input. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
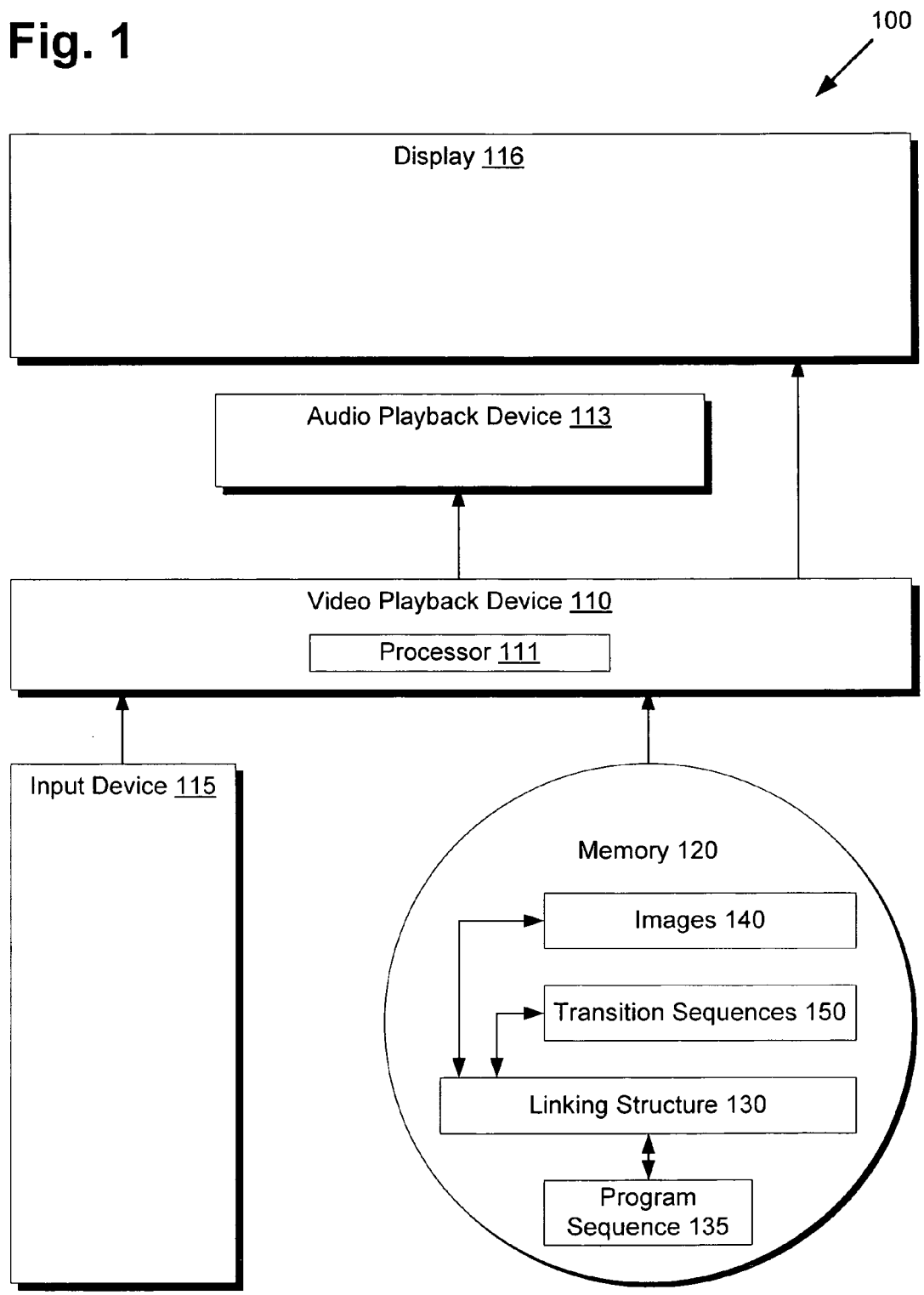
FIG. 1 presents a block diagram of a system for an interactive environment presented by a video playback device in response to user input, according to one embodiment of the present invention.

FIG. 1 presents a block diagram of a system for an interactive environment presented by a video playback device in response to user input, according to one embodiment of the present invention. Environment 100 includes video playback device 110, audio playback device 113, input device 115, display 116, and memory 120. Video playback device 110 includes processor 111. Memory 120 includes linking structure 130, program sequence 135, images 140, and transition sequences 150.

Video playback device 110 may comprise a number of different embodiments supporting video playback, such as, for example, a standalone DVD-Video player, a videogame console, a Blu-ray Disc player, a desktop computer or notebook computer, a mobile phone, a handheld video game system, or a portable media player. For audio output, video playback device 110 may use audio playback device 113, which may comprise an integrated component such as an internal speaker, or an externally connected component such as a surround sound audio receiver or headphones. For video output, video playback device 110 may use display 116, which may comprise an integrated component such as an internal liquid crystal display (LCD) screen, or an externally connected component such as a computer monitor, a television, or a high definition television (HDTV). Similarly, input device 115 may be an integrated component, such as an integrated keyboard or touchscreen, or may be an externally connected component, such as an infrared or Bluetooth remote control, or a wireless or wired keyboard or gamepad. By interacting with input device 115, a user can control video playback device 110.

In order to display content, video playback device 110 needs access to media resources, which are stored in memory 120. Memory 120 may comprise, for example, optical media such as a DVD or Blu-ray disc, flash memory, a magnetic hard disk drive, or any other storage media. Besides storing the primary video content, which could be a feature film, animation, television program, or other recorded content, memory 120 may include extra supplementary content or bonus content separate from the primary video content, or the extra supplementary content may be provided separately from the primary video content, such as on a separate disc.

Once video playback device 110 has access to memory 120, processor 111 can execute or interpret program sequence 135 to utilize linking structure 130 for providing an interactive environment controllable by the user via input device 115. Program sequence 135 might comprise, for example, Blu-ray Disc Java (BD-J) Xlets, for interpretation by a Java Virtual Machine (VM) executing in a Blu-ray player, bytecode in the DVD-Video Virtual Machine (VM) command set, for interpretation by a DVD-Video player, Shockwave Flash bytecode, for interpretation by a Flash player, or Silverlight bytecode, for interpretation by a Silverlight player. Program sequence 135 can parse linking structure 130 to update display 116 in response to user input by selecting and displaying appropriately from images 140 and transition sequences 150.

Figure 2:
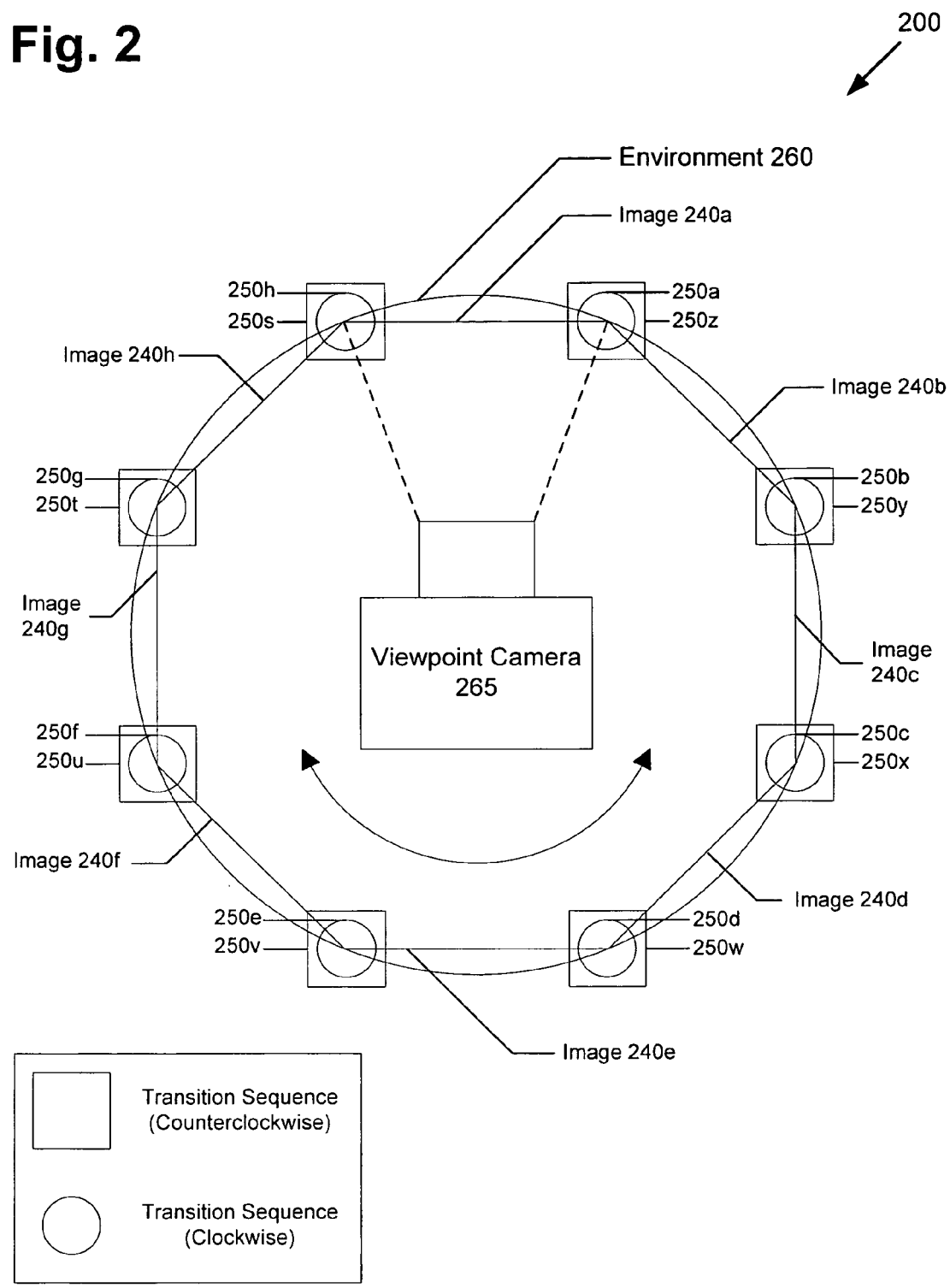
FIG. 2 presents a block diagram of a set of images and transition sequences for use by a video playback device to provide a user interactive environment, according to one embodiment of the present invention.

FIG. 2 presents a block diagram of a set of images and transition sequences for use by a video playback device to provide a user interactive environment, according to one embodiment of the present invention. Diagram 200 includes images 240a-240h, transition sequences 250a-250h and 250s-250z, environment 260, and viewpoint camera 265. With regard to FIG. 2, it should be noted that images 240a-240h correspond to images 140 from FIG. 1, and that transition sequences 250a-250h and 250s-250z correspond to transition sequences 150 from FIG. 1.

Diagram 200 provides an example where a user is enabled to freely explore environment 260 by rotating viewpoint camera 265 left (counterclockwise) or right (clockwise), providing a panoramic 360-degrees view from the location of viewpoint camera 265. However, since environment 260 may need to be pre-rendered in advance rather than being rendered in real-time to accommodate possible limitations of video playback devices, viewable scenes from viewpoint camera 265 are divided into discrete segments represented by images 240a-240h and transition sequences 250a-250h and 250s-250z. Images 240a-240h may represent still frames corresponding to the appropriate rotation for viewpoint camera 265. In alternate embodiments, images 240a-240h may comprise looped animated frames to support, for example, constant environmental motion such as a flowing river or trees swaying in the wind. For largely static environments that may not need environmental animation such as indoor sets, still frames may suffice. Transition sequences 250a-250h may represent right or clockwise rotations transitioning from one image to another, and transition sequences 250s-250z may represent left or counterclockwise rotations transitioning from one image to another.

Describing images 240a-240h in more detail, image 240a may correspond to viewpoint camera 265 rotated by approximately 90 degrees, or facing north; image 240b may correspond to viewpoint camera 265 rotated by approximately 45 degrees, or facing northeast; image 240c may correspond to viewpoint camera 265 rotated by approximately 0 degrees, or facing east; image 240d may correspond to viewpoint camera 265 rotated by approximately 315 degrees, or facing southeast; image 240e may correspond to viewpoint camera 265 rotated by approximately 270 degrees, or facing south; image 240f may correspond to viewpoint camera 265 rotated by approximately 225 degrees, or facing southwest; image 240g may correspond to viewpoint camera 265 rotated by approximately 180 degrees, or facing west; image 240h may correspond to viewpoint camera 265 rotated by approximately 135 degrees, or facing northwest.

In diagram 200, each image from images 240a-240h has two available transition sequences to smoothly transition to another image from images 240a-240h. The convention adopted in diagram 200 indicates the available transitions at the right edge of each image. Thus, for example, image 240a has access to transition sequence 250a transitioning to image 250b, and transition sequence 250z transitioning to image 240h. Similarly, image 240b has access to transition sequence 250b transitioning to image 250c, and transition sequence 250y transitioning to image 240a. Images 240c-240h are also configured in a similar manner.

To generate images 240a-240h, specialized panoramic video capture equipment might be utilized, such as fisheye lenses and camera equipment capable of capturing cylindrical or spherical images. Transition sequences 250a-250h and 250s-250z might also be captured using the specialized panoramic video capture equipment, for example through camera equipment having controllable 360-degree rotation. Alternatively, transition sequences 250a-250h and 250s-250z may be derived using images 240a-240h as a stitched cylindrical or spherical panoramic image, wherein smooth video sequences can be generated by simply panning the video frame from one image to another in the panorama.

Although diagram 200 does not provide for tilting viewpoint camera 265 upwards towards the sky and downwards towards the ground in environment 260, alternative embodiments may include this functionality by adding additional transition sequences and images to support full 360 by 180 degrees panoramas, or spherical panoramas. The ability to zoom viewpoint camera 265 in and out may also be provided, and movement of viewpoint camera 265 from its initial location may also be provided, by adding appropriate sets of images and transition sequences. The ability to pan at various transition speeds might also be provided by adding multiple transition sequences for each image. However, it may be impractical to provide extensive viewpoint flexibility if memory storage resources are limited, as may be the case for optical video discs such as DVD-Video and Blu-ray Discs. Thus, balancing free control of viewpoint camera 265 and storage consumption may merit careful consideration.

To reduce storage demands, various techniques might be employed, depending on the capabilities of the video playback device using the images and transition sequences shown in diagram 200. For example, if clockwise and counterclockwise rotations can be reversed to simulate rotations in opposite directions, then only a single rotation transition sequence is necessary per image, as transitions can simply be played in reverse to simulate rotations in opposite directions. However, if clockwise and counterclockwise rotations differ in content, then this technique may have limited applicability. For example, if viewpoint camera 265 also tracks an actor following the rotations of viewpoint camera 265, simply reversing transition sequences may lead to unnatural looking transitions where the actor appears to be walking backwards. In this case, separate transition sequences with the actor walking clockwise and counterclockwise may be necessary to provide the most natural looking results.

Zoom might also be derived digitally, rather than actually capturing viewpoints at different zoom levels. This technique is analogous to "digital zoom" in digital cameras, where interpolation of image pixels is substituted for actual optical zooming of a camera lens. For studios capturing master footage in a higher resolution than displayable on commercially released video, a variation of this technique may be used without significant degradation in visual quality by relying on the original master footage for zoomed in details. If higher resolution masters are unavailable, digital zoom can still be utilized for satisfactory image quality, up to a certain extent. Transition sequences between zoom levels can be derived by gradually changing the zoom level using digital zoom or optical zoom.

To support variable transition movement speed, the transition sequences may simply be played at various frame-rates to simulate different movement speeds, rather than having to record multiple transition sequences of varying speeds. However, the video capture device may need to support variable frame rate playback, which may not be supported, particularly on fixed-rate displays which typically only support inputs at 24, 50, or 60 frames per second. Moreover, since this effect is analogous to fast forward or fast rewind, a careful observer may notice visual anomalies, such as wind blowing too fast on trees, or a sudden increase in playback frame-rate. If the video playback device can, for example, change playback rate in real-time at a constant frame-rate, then some of these issues may be mitigated, and variable frame-rate playback might acceptably substitute for storing multiple transition sequences of varying speeds.

Once the capabilities of the video playback device, the available storage space, and the desired flexibility for viewpoint camera 265 is known, a set of images and transition sequences as outlined above may be generated as environment 260 controllable by a user. Returning back to FIG. 1, even if video playback device 110 does not natively support real-time rendering of interactive environments, the components of memory 120, described above in conjunction with FIG. 2, can still provide a similar experience via a pre-rendered simulation. As previously discussed, a balance between freedom of viewpoint camera 265 and storage usage may need to be adjusted for optimal results.

Figure 3:
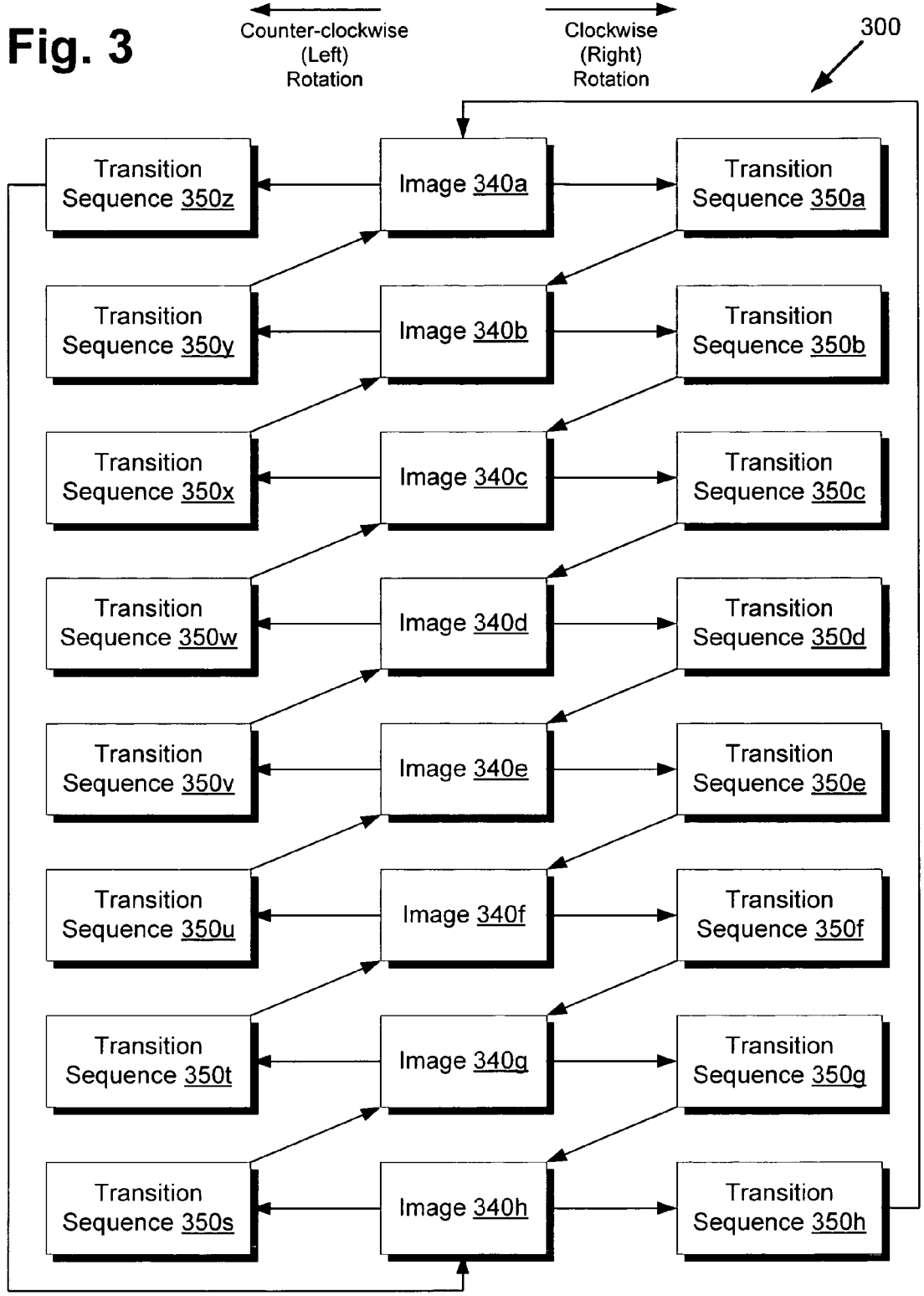
FIG. 3 presents a block diagram of an exemplary linking structure, according to one embodiment of the present invention.

FIG. 3 presents a block diagram of an exemplary linking structure, according to one embodiment of the present invention. Linking structure 300 includes images 340a-340h and transition sequences 350a-350h and 350s-350z. With regard to FIG. 3, it should be noted that images 340a-340h correspond to images 240a-240h from FIG. 2, and that transition sequences 350a-350h and 350s-350z correspond to transition sequences 250a-250h from FIG. 2.

Diagram 300 of FIG. 3 expresses, in an alternate fashion, much of the same information expressed in diagram 200 of FIG. 2. That is, each image from images 340a-340h has two valid transition sequences available to transition to other images, which move a viewpoint camera counterclockwise (left) or clockwise (right) via a pre-rendered video sequence. The information expressed in linking structure 300 could be stored, for example, within a linked list, an array of structures, a database, or by another suitable data structure. Additional metadata might be embedded with each transition sequence, such as an associated direction of movement, a reference to a filename or other pointer to the actual video clip, and playback parameters such as frame-rate.

Furthermore, if audio playback device 113 of FIG. 1 comprises a multi-channel audio playback system, each transition sequence of linking structure 300 might also reference a multi-channel audio file for supporting positional audio synchronized with the video clip. Alternatively, a single-channel audio file with multi-channel panning values might be substituted for the multi-channel audio file. For example, if image 240e centered on a shot of an ocean view, transition sequences 350d and 350u might reference positional audio files panning ocean wave sounds from side speakers to front speakers, helping to provide a heightened sense of immersion.

Thus, by having the relationships between images 340a-340h and transition sequences 350a-350h and 350s-350z as described within linking structure 300, instructions such as program sequence 135 of FIG. 1 may parse the relationships to determine how to respond to user input provided by, for example, input device 115 of FIG. 1. In this manner, a user is enabled to interact with an environment via video playback device 110 and display 116, even if video playback device 110 lacks native support for real-time interactive environments.

Figure 4:
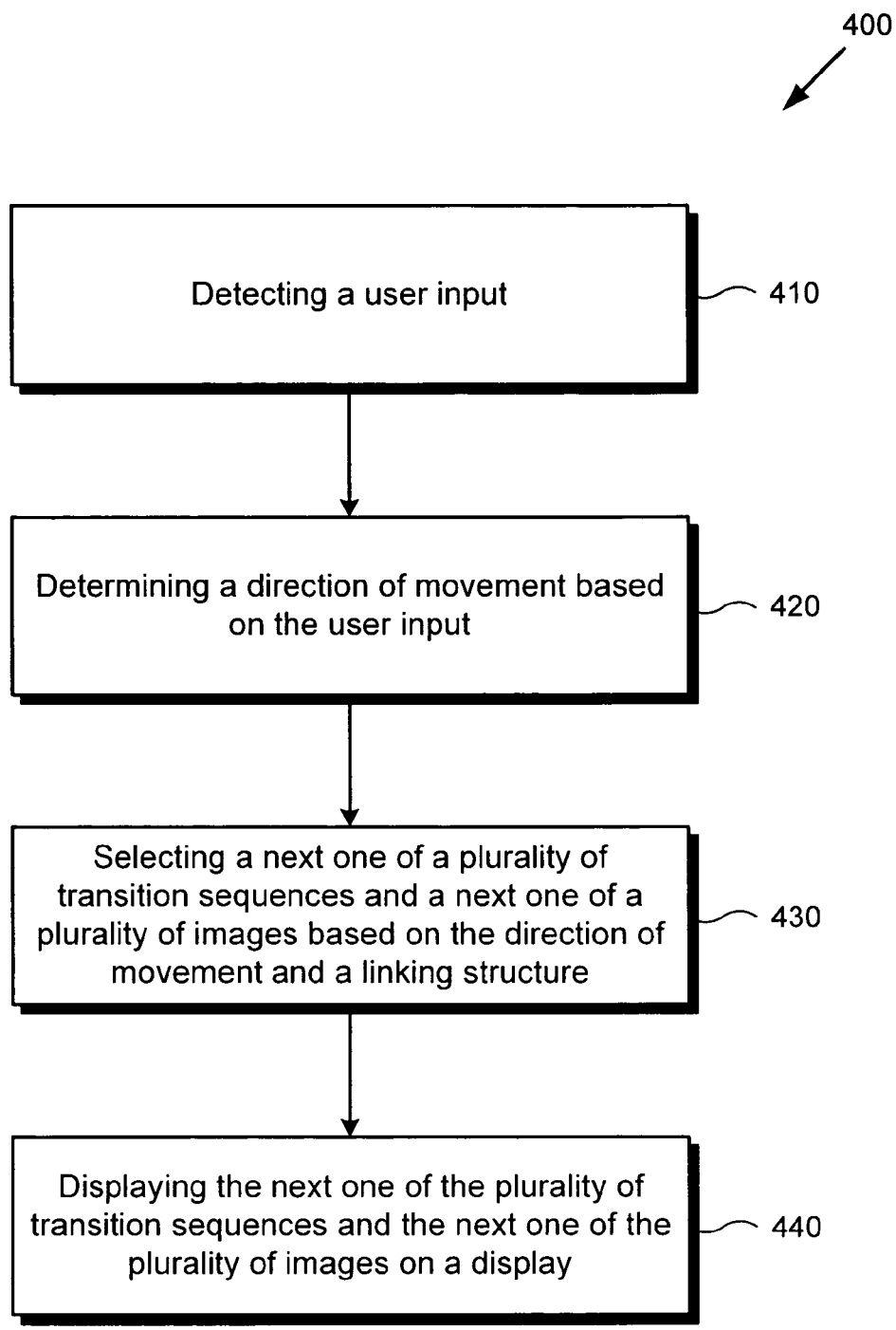
FIG. 4 shows a flowchart describing the steps, according to one embodiment of the present invention, by which a processor of a video playback device can provide an interactive environment in response to user input.

FIG. 4 shows a flowchart describing the steps, according to one embodiment of the present invention, by which a processor of a video playback device can provide an interactive environment in response to user input. Certain details and features have been left out of flowchart 400 that are apparent to a person of ordinary skill in the art. For example, a step may comprise one or more substeps or may involve specialized equipment or materials, as known in the art. While steps 410 through 440 indicated in flowchart 400 are sufficient to describe one embodiment of the present invention, other embodiments of the invention may utilize steps different from those shown in flowchart 400.

Referring to step 410 of flowchart 400 in FIG. 4 and environment 100 of FIG. 1, step 410 of flowchart 400 comprises processor 111 detecting a user input from input device 115. As previously discussed, input device 115 could comprise a remote control, a gamepad, a keyboard, a touchscreen, or any other input device, wired or wireless. For example, buttons arranged in four directions could control rotation and zoom, and number buttons might control the speed of movement. Input might also be recognized through manipulating icons or other widgets displayed on display 116, particularly if input device 115 comprises a touchscreen or a pointing device such as a mouse. Processor 111 can detect which of these buttons or icons are selected in step 410.

Referring to step 420 of flowchart 400 in FIG. 4 and environment 100 of FIG. 1, step 420 of flowchart 400 comprises processor 111 determining a direction of movement based on the user input read detected from step 410. Step 420 may be accomplished by mapping particular inputs to particular directions of movement. For example, a button press on a left arrow button may correspond to a counterclockwise or left rotation, whereas a button press on a right arrow button may correspond to a clockwise or right rotation. As previously discussed, other motions may be supported besides cylindrical rotation, such as full 360 by 180 degree spherical rotation, zooming, and viewpoint camera movement. Additional buttons or inputs may be mapped to support these additional functionalities in step 420.

Referring to step 430 of flowchart 400 in FIG. 4 and environment 100 of FIG. 1, step 430 of flowchart 400 comprises processor 111 selecting a transition sequence from transition sequences 150 and an image from images 140 based on the direction of movement determined in step 420 and linking structure 130. Step 430 may be accomplished by processor 111 executing program sequence 135 to execute or interpret linking structure 130, which describes the relationship between images 140 and transition sequences 150. As previously discussed, program sequence 135 may be interpretable using built in functionality of video playback device 110, such as BD-J Xlets, DVD-Video VM bytecode, Flash bytecode, or Silverlight bytecode.

Program sequence 135 may keep track of the currently displayed image from images 140 to determine available transition sequences from transition sequences 150 using linking structure 130. As previously discussed, linking structure 130 may also include additional metadata, such as associated directions of movement, for those available transition sequences. Selecting the correct transition sequence corresponding to the user input may be accomplished by matching the direction of movement determined in step 420 to the metadata of the available transition sequences.

For example, examining linking structure 300 of FIG. 3, if program sequence 135 is currently displaying image 340a on display 116 of FIG. 1, a left rotation movement determined from step 420 may be matched against transition sequence 350z, which may include associated metadata indicating a counterclockwise or left rotation movement. Furthermore, linking structure 300 indicates that if transition sequence 350z is selected, then the next image to select and display is image 340h. Thus, in this example, step 430 would select transition sequence 350z from transition sequences 150 and image 340h from images 140.

If additional functionality is supported by linking structure 300 such as variable speed transitions, then this additional functionality may be implemented in step 430 as well. For example, if user input previously indicated a faster transition speed, then an alternative transition sequence, not shown in FIG. 3, might be selected, transitioning faster to image 340g, skipping image 340h. Alternatively, as previously discussed, various techniques, such as variable frame-rate and real-time playback speed adjustment, might be used in lieu of separate alternative transition sequences.

Referring to step 440 of flowchart 400 in FIG. 4 and environment 100 of FIG. 1, step 440 of flowchart 400 comprises processor 111 displaying the selected transition sequence and selected image from step 430 on display 116. Step 440 can be accomplished using the standard menu presentation and video playback functionality of video playback device 110, circumventing the need for real-time processing of an interactive environment. Continuing with the example utilizing FIG. 3, step 440 would comprise processor 111 outputting transition sequence 350z on display 116, which would comprise a smooth panning of a viewpoint camera from image 340a to image 340h. As previously discussed, this step may be accompanied by playback of positional audio at audio playback device 113 for enhanced immersion. Additional non-positional ambient music or sounds may also be mixed in to provide enhanced atmosphere as well. After transition sequence 350z is finished playing back, image 340h can be displayed on display 116, and processor 111 can process further user input by repeating the steps shown in flowchart 400.

Furthermore, if processor 111 keeps a history of the traversal of linking structure 130, various interactive elements can be presented to the user based on the user's interaction with the environment. For example, if multiple transitions to a particular image are available, taking different paths to that image may affect the content of the interactive elements presented to the user. If the environment supported by linking structure 130 supports movement to a particular destination image by a land route or a sea route, a special feature might be presented at the destination image depending on the particular route taken. Another example might comprise unlocking secret content depending on areas of the environment previously explored. In this manner, contextually relevant interactivity can be provided to the user, providing enhanced immersion tailored to the user's interests, unlike panoramic video clips with a predetermined motion path, or a non-interactive video feature.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A video playback device for providing an interactive environment on a display in response to a user input, the video playback device comprising:
   a memory configured to store:
      a plurality of images forming a plurality of viewpoints of the interactive environment;
      a plurality of recorded transition clips, wherein each of the plurality of transition clips provides a video transition from one image to another image of the plurality of images; and
      a linking structure linking the plurality of images with the plurality of recorded transition clips; and
   a processor configured to:
      determine a direction of movement based on the user input;
      select a next one of the plurality of recorded transition clips and a next one of the plurality of images based on the direction of movement and the linking structure;
      display the next one of the plurality of recorded transition clips and the next one of the plurality of images on the display; and
      playback positional audio moving consistently with the direction of movement.

2. The video playback device of claim 1, wherein the processor is further configured to execute a program comprising Xlets to determine, select and display.

3. The video playback device of claim 1, wherein the processor is further configured to execute a program comprising DVD-Video Virtual Machine bytecode to determine, select and display.

4. The video playback device of claim 1, wherein the processor is further configured to detect the user input.

5. The video playback device of claim 1, wherein the processor is further configured to playback the positional audio via a multi-channel audio playback device.

6. The video playback device of claim 1, wherein the linking structure provides for 360-degrees horizontal viewpoint rotations of the interactive environment, and wherein the user input comprises commands determinable by the processor as a clockwise or right direction of movement and a counterclockwise or left direction of movement.

7. The video playback device of claim 1, wherein the linking structure provides for 180-degrees vertical viewpoint rotations of the interactive environment, and wherein the user input comprises commands determinable by the processor as a upwards direction of movement and a downwards direction of movement.

8. The video playback device of claim 1, wherein the linking structure provides for viewpoint movement of the interactive environment, and wherein the user input comprises commands determinable by the processor as a northern direction of movement, a southern direction of movement, and a western direction of movement, and an eastern direction of movement.

9. The video playback device of claim 1, wherein the linking structure provides for viewpoint zooming of the interactive environment, and wherein the user input comprises commands determinable by the processor as a forward zoom movement and a backward zoom movement.

10. The video playback device of claim 1, wherein the linking structure provides for variable speed viewpoint movements, and wherein the user input comprises commands determinable by the processor as movement speed adjustments.

11. The video playback device of claim 1, wherein the processor is further configured to present, on the display, a contextual user interface element based on a recorded history of selections from the linking structure.

12. The video playback device of claim 1, wherein the processor is further configured to detect the user input from a wireless receiver configured to read the user input from an interaction with a wireless transmitter.

13. A method of providing an interactive environment, in response to a user input, for use by a processor of a video playback device having a memory storing a plurality of images forming a plurality of viewpoints of the interactive environment; a plurality of recorded transition clips, wherein each of the plurality of recorded transition clips provides a video transition from one image to another image of the plurality of images; and a linking structure linking the plurality of images with the plurality of recorded transition clips, the method comprising:

determining a direction of movement based on the user input;

selecting a next one of the plurality of recorded transition clips and a next one of the plurality of images based on the direction of movement and the linking structure;

displaying the next one of the plurality of recorded transition clips and the next one of the plurality of images on the display; and playing back positional audio moving consistently with the direction of movement.

14. The method of claim 13, further comprising playing back the positional audio via a multi-channel audio playback device.

15. The method of claim 13, wherein the detecting the user input comprises determining a clockwise or counterclockwise direction of movement, and wherein the linking structure provides for 360-degrees horizontal viewpoint rotations of the interactive environment.

16. The method of claim 13, wherein the detecting the user input comprises determining an upwards or downwards direction of movement, and wherein the linking structure provides for 180-degrees vertical viewpoint rotations of the interactive environment.

17. The method of claim 13, wherein the detecting the user input comprises determining a forward zoom movement or a backward zoom movement, and wherein the linking structure provides for viewpoint zooming of the interactive environment.

18. The method of claim 13, wherein the detecting the user input comprises increasing or decreasing a speed of the direction of movement, and wherein the linking structure provides for variable speed viewpoint movements.

19. The method of claim 13, further comprising presenting, on the display, a contextual user interface element based on a recorded history of selections from the linking structure.

* * * * *